US009282474B2

(12) United States Patent
Ishihara et al.

(10) Patent No.: US 9,282,474 B2
(45) Date of Patent: Mar. 8, 2016

(54) WIRELESS COMMUNICATION DEVICE, WIRELESS COMMUNICATION SYSTEM, AND CHANNEL SELECTION METHOD

(75) Inventors: Masahiro Ishihara, Tokyo (JP); Hiroaki Ushirosako, Tokyo (JP); Yoshiaki Koizumi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 95 days.

(21) Appl. No.: 14/130,337

(22) PCT Filed: Jul. 8, 2011

(86) PCT No.: PCT/JP2011/065736
§ 371 (c)(1),
(2), (4) Date: Dec. 31, 2013

(87) PCT Pub. No.: WO2013/008291
PCT Pub. Date: Jan. 17, 2013

(65) Prior Publication Data
US 2014/0153378 A1    Jun. 5, 2014

(51) Int. Cl.
| | |
|---|---|
| H04W 24/02 | (2009.01) |
| H04W 74/08 | (2009.01) |
| H04W 72/02 | (2009.01) |
| H04W 48/20 | (2009.01) |

(52) U.S. Cl.
CPC .............. *H04W 24/02* (2013.01); *H04W 48/20* (2013.01); *H04W 72/02* (2013.01); *H04W 74/0808* (2013.01)

(58) Field of Classification Search
None
See application file for complete search history.

(56) References Cited

U.S. PATENT DOCUMENTS

| | | | |
|---|---|---|---|
| 5,551,064 A | | 8/1996 | Nobbe et al. |
| 6,041,238 A | * | 3/2000 | Tanoue ..................... 455/452.2 |
| 2007/0060158 A1 | * | 3/2007 | Medepalli et al. ............ 455/450 |
| 2007/0133473 A1 | * | 6/2007 | Takagi et al. ................. 370/334 |

(Continued)

FOREIGN PATENT DOCUMENTS

| | | |
|---|---|---|
| JP | 2005-159760 A | 6/2005 |
| JP | 2010-103665 A | 5/2010 |

(Continued)

OTHER PUBLICATIONS

International Search Report of the International Searching Authority mailed Aug. 2, 2011 for the corresponding international application No. PCT/JP2011/065736 (and English translation).
Extended European Search Report dated Mar. 12, 2015 issued in corresponding EP patent application No. 11869420.7.

*Primary Examiner* — Kerri Rose
(74) *Attorney, Agent, or Firm* — Posz Law Group, PLC

(57) ABSTRACT

An electric field intensity measuring circuit measures the electric field intensity of each of multiple communication channels available for data communication. A channel determiner compares electric field intensities measured by an electric field intensity measuring circuit with multiple different thresholds including a first threshold as the carrier sense threshold and a second threshold that is the detrimental interference level the interference of which causes the reception sensitivity to deteriorate, counts the numbers of times that the electric field intensity exceeds the thresholds on each communication channel, and selects a communication channel for use based on the counted numbers of times that the thresholds have been exceeded on the communication channels.

19 Claims, 6 Drawing Sheets

(56) References Cited

U.S. PATENT DOCUMENTS

2008/0151849 A1* 6/2008 Utsunomiya et al. ......... 370/338
2009/0067403 A1* 3/2009 Chan et al. .................... 370/343
2012/0002567 A1* 1/2012 Sun et al. ...................... 370/252

FOREIGN PATENT DOCUMENTS

| JP | 2011-015051 A | 1/2011 |
| WO | 96/05709 A1 | 2/1996 |
| WO | 2007/055000 A1 | 5/2007 |

* cited by examiner

| CHANNEL | NUMBER OF TIMES OF THRESHOLD a1 BEING EXCEEDED | NUMBER OF TIMES OF THRESHOLD a2 BEING EXCEEDED |
|---|---|---|
| CHANNEL A | 12 | 23 |
| CHANNEL B | 10 | 20 |
| CHANNEL C | 3 | 5 |
| CHANNEL D | 1 | 10 |

WIRELESS COMMUNICATION DEVICE, WIRELESS COMMUNICATION SYSTEM, AND CHANNEL SELECTION METHOD

CROSS REFERENCE TO RELATED APPLICATION

This application is a U.S. national stage application of International Application No. PCT/JP2011/065736 filed on Jul. 8, 2011.

TECHNICAL FIELD

The present invention relates to a wireless communication device, wireless communication system, and channel selection method. More specifically, the present invention relates to a wireless communication device, wireless communication system, and channel selection method used in a communication environment that includes a mixture of multiple communication systems.

BACKGROUND ART

A wireless communication system is elaborated to prevent multiple wireless communication devices from transmitting concurrently and thus prevent cross-talk by means of a communication procedure such as CSMA/CA (carrier sense multiple access/collision avoidance). With the above communication procedure, multiple wireless communication devices shill the time of using a communication channel in a time sharing manner to prevent cross-talk.

Furthermore, multiple communication channels consisting of slightly shifted radio wave frequency bands are prepared, for example, as follows, and multiple wireless communication devices use the communication channels of the frequency bands, respectively, to prevent cross-talk.

(Exemplary 2.4 GHz band channels)
Channel 1: 2412 MHz;
Channel 2: 2417 MHz;
Channel 3: 2422 MHz;
Channel 4: 2427 MHz;
Channel 5: 2432 MHz;
Channel 6: 2437 MHz;
(snip)
Channel 13: 2472 MHz.

With the above communication procedure, if a newly activated wireless communication device selects a less frequently used communication channel, the device can use the communication channel for a prolonged time and thus conduct efficient communication.

For selecting a less frequently used communication channel, the activated communication device measures the electric field intensity of multiple available communication channels and selects an idle communication channel before starting any communication.

For example, a data communication device measuring the electric field intensity of multiple communication channels available for data communication repeatedly multiple times, comparing the electric field intensity measurement results with a threshold ("the electric field intensity threshold," hereafter), and selecting the communication channel with the highest number of times of the measurement results being less than the electric field intensity threshold as the communication channel for use is disclosed (for example, see Patent Literature 1).

The above wireless communication device can prevent cross-talk with other wireless communication systems as much as possible even in a communication environment that includes a mixture of various communication devices.

CITATION LIST

Patent Literature

Patent Literature 1: Unexamined Japanese Patent Application Kokai Publication No. 2010-103665.

SUMMARY OF INVENTION

Technical Problem

The wireless communication device described in the Patent Literature 1 generally uses the carrier sense threshold of the wireless communication device as the aforementioned electric field intensity threshold. The carrier sense threshold is the threshold for not conducting the transmission in the event that any electric field intensity exceeding this threshold is measured in the CSMA/CA carrier sense. In this way, it can be determined whether the available transmission time is longer or shorter on the communication channel of which the electric field intensity is measured.

However, generally, the reception sensitivity of a wireless communication device is designed to be less than the carrier sense threshold. Therefore, if there are concurrent transmission waves equal to or less than the carrier sense threshold, the wireless communication device is interfered with by the concurrent transmission waves and the reception sensitivity of the device deteriorates, For that reason, when the electric field intensity threshold is set to the carrier sense threshold, it can be determined whether the available transmission time is longer or shorter on each communication channel; however, it is difficult to determine whether the frequency of being interfered with by concurrent transmission waves equal to or less than the carrier sense threshold is higher or lower.

The present invention is invented in the view of the above situation and an exemplary objective of the present invention is to provide a wireless communication device, wireless communication system, and channel selection method capable of prolonging the available transmission time and selecting a less frequently interfered channel for improving the communication efficiency.

Solution to Problem

In order to achieve the above objective, in the wireless communication device according to the present invention, an electric field intensity measurer measures the electric field intensity of each of multiple communication channels available for data communication repeatedly multiple times. A channel determiner compares multiple electric field intensities measured by the electric field intensity measurer with multiple different thresholds including a first threshold as the carrier sense threshold and a second threshold that is the detrimental interference level, the interference of which causes the reception sensitivity to deteriorate, counts the numbers of times that the electric field intensity exceeds the thresholds on each communication channel, and selects a communication channel for use based on the counted numbers of times that the thresholds have been exceeded on the communication channels.

Advantageous Effects of Invention

With the present invention, for example, it can be determined whether the available transmission time is longer or shorter based on the number of times that the electric field intensity exceeds a first threshold and it can be determined whether the frequency of interference from concurrent transmission waves equal to or less than the carrier sense threshold is higher or lower based on the number of times that the electric field intensity exceeds a second threshold. Then, it is possible to prolong the available transmission time and select a less frequently interfered with communication channel by selecting a communication channel for use based on the numbers of times that these thresholds have been exceeded. Consequently, the communication efficiency can be improved.

DESCRIPTION OF EMBODIMENTS

An embodiment of the present invention will be described in detail hereafter with reference to the drawings.

Figure 1:
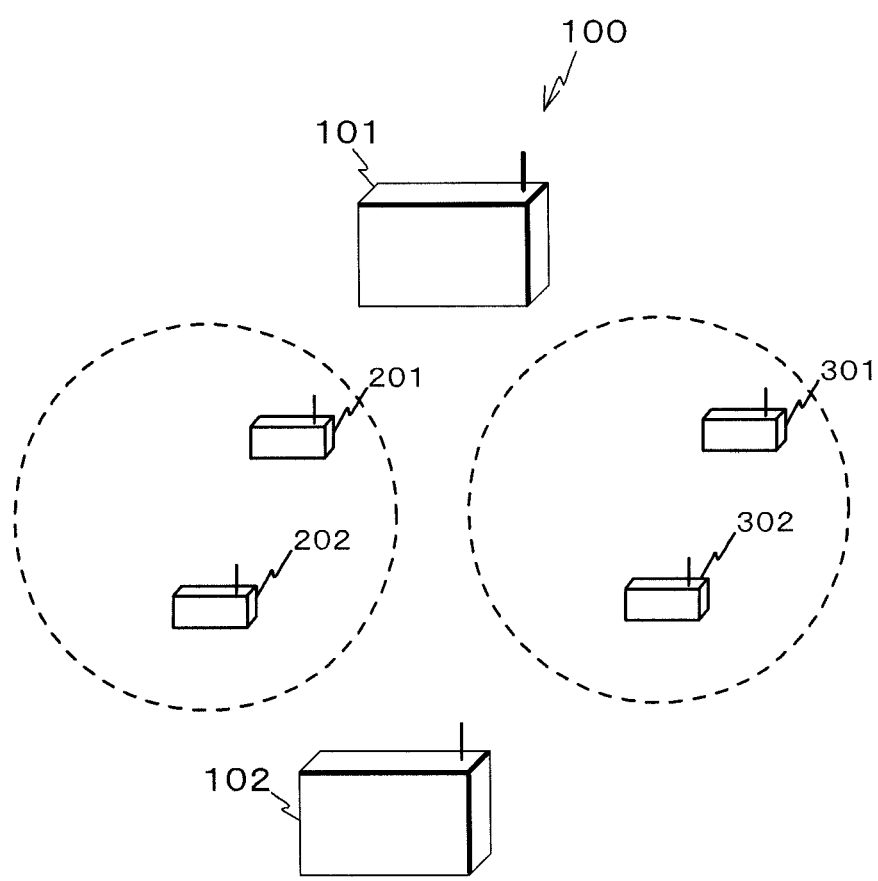
FIG. 1 is a block diagram showing the configuration of the wireless communication system according to an embodiment of the present invention.

FIG. 1 shows the configuration of the wireless communication system according to the embodiment. A wireless communication system 100 according to the embodiment comprises a wireless communication device (base unit) 101 and a wireless communication device (additional unit) 102.

Multiple other wireless communication systems are present in the communication environment of the wireless communication system 100. In FIG. 1, wireless communication devices 201, 202, 301, and 302 are shown as examples of other such wireless communication devices. The wireless communication devices 201 and 202 and wireless communication devices 301 and 302 are wireless communication devices used in different wireless communication systems. The wireless communication devices 201 and 202 and wireless communication devices 301 and 302 may use different communication channels or use the same communication channel, The configuration of the wireless communication device (base unit) 101 according to the embodiment will be described hereafter with reference to FIG. 2.

Figure 2:
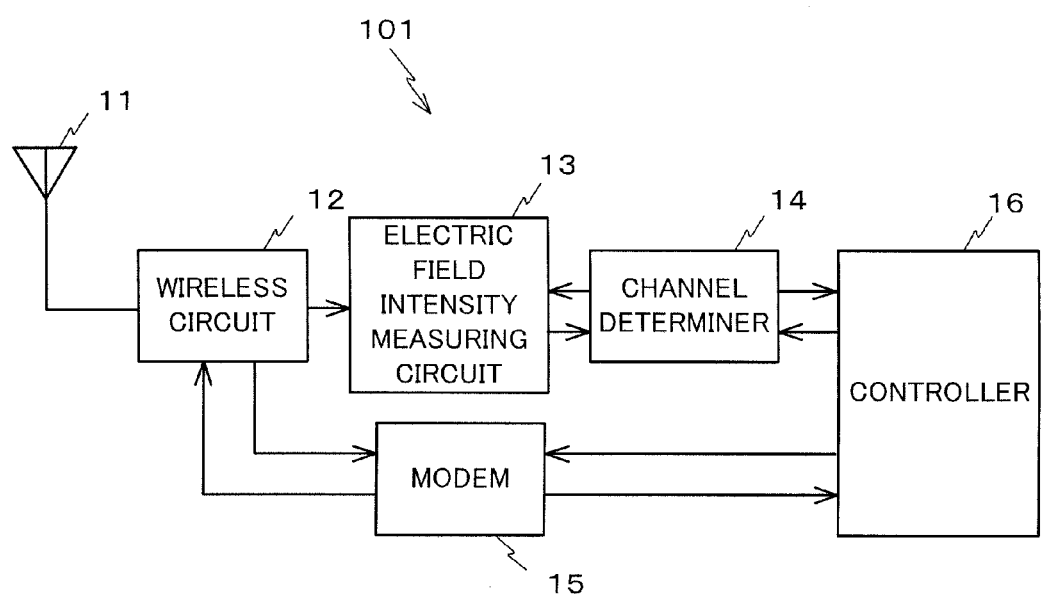
FIG. 2 is a block diagram showing the configuration of the wireless communication device (base unit) according to an embodiment of the present invention.

As shown in FIG. 2, the wireless communication device (base unit) 101 comprises an antenna 11, a wireless circuit 12, an electric field intensity measuring circuit 13, a channel determiner 14, a modem 15, and a controller 16.

The antenna 11 transmits/receives radio waves. The antenna 11 is connected to the wireless circuit 12.

The wireless circuit 12 comprises a receiver (not shown) receiving radio signals corresponding to radio waves received by the antenna 11. The receiver of the wireless circuit 12 comprises, for example, a filter limiting the band of radio signals, an LNA (low noise amplifier) amplifying the radio signals, a mixer converting the radio signals to an IF (intermediate frequency) stage, and the like. On the other hand, the wireless circuit 12 comprises a transmitter (not shown) transmitting radio signals corresponding to radio waves transmitted from the antenna 11. The transmitter of the wireless circuit 12 comprises a PA (power amplifier) and the like.

The electric field intensity measuring circuit 13 has multiple communication channels and extracts radio signals on each communication channel from the radio signals output from the wireless circuit 12. The electric field intensity measuring circuit 13 measures the electric field intensity (reception level) of the extracted radio signals on each communication channel. More specifically, the electric field intensity measuring circuit 13 measures the electric field intensity of the radio signals on each of multiple communication channel available for communication of data output from the wireless circuit 12 repeatedly multiple times.

The channel determiner 14 is connected to the electric field intensity measuring circuit 13. The channel determiner 14 is, for example, a microcontroller. The channel determiner 14 determines the reception state of radio signals on a channel based on the electric field intensity measured by the electric field intensity measuring circuit 13.

The channel determiner 14 comprises a memory (not shown) storing multiple thresholds used in determining the channel and determination results. The multiple thresholds include a threshold a1 (first threshold) as the carrier sense threshold and a threshold a2 (second threshold) that is the detrimental interference level the interference of which causes the reception sensitivity to deteriorate, The channel determiner 14 compares the electric field intensity measured by the electric field intensity measuring circuit 13 multiple times with multiple different thresholds including the thresholds a1 and a2, counts the numbers of times that the electric field intensity exceeds the thresholds a1 and a2 on each communication channel, and stores the numbers of times in the memory.

Furthermore, the channel determiner 14 selects a communication channel for use based on the counted numbers of times that the thresholds a1 and a2 have been exceeded on the communication channels.

The wireless circuit 12 is also connected to the modem 15. The modem 15 demodulates the radio signals output from the wireless circuit 12 and modulates the radio signals to be output to the wireless circuit 12.

The channel determiner 14 and modem 15 are connected to the controller 16.

The controller 16 is, for example, a microcontroller. The controller 16 comprises a CPU and memory (neither is shown) and operates as the CPU executes the programs stored in the memory.

The controller 16 totally controls the wireless communication device (base unit) 101. The controller 16 receives signals via the antenna 11, wireless circuit 12, and modem 15, and transmits signals via the modem 15, wireless circuit 12, and antenna 11. Furthermore, the controller 16 switches the communication channel for transmitting/receiving signals.

Figure 3:
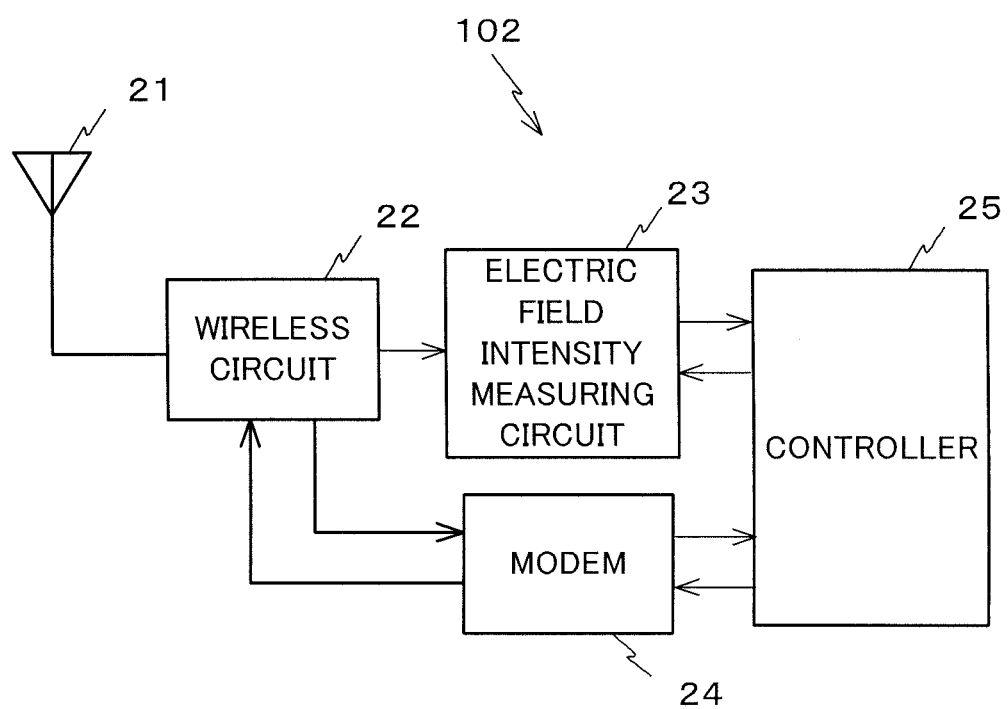
FIG. 3 is a block diagram showing the configuration of the wireless communication device (additional unit) according to an embodiment of the present invention.

The configuration of the wireless communication device (additional unit) 102 in the embodiment will he described hereafter with reference to FIG. 3.

As shown in FIG. 3, the wireless communication device (additional unit) 102 comprises an antenna 21, a wireless circuit 22, an electric field intensity measuring circuit 23, a modem 24, and controller 25. The wireless communication device (additional unit) 102 has the same configuration as the wireless communication device (base unit) 101 except that the wireless communication device (additional unit) 102 does not have the channel determiner 14.

Operation of the wireless communication system 100 according to the embodiment will be described hereafter.

Figure 4:
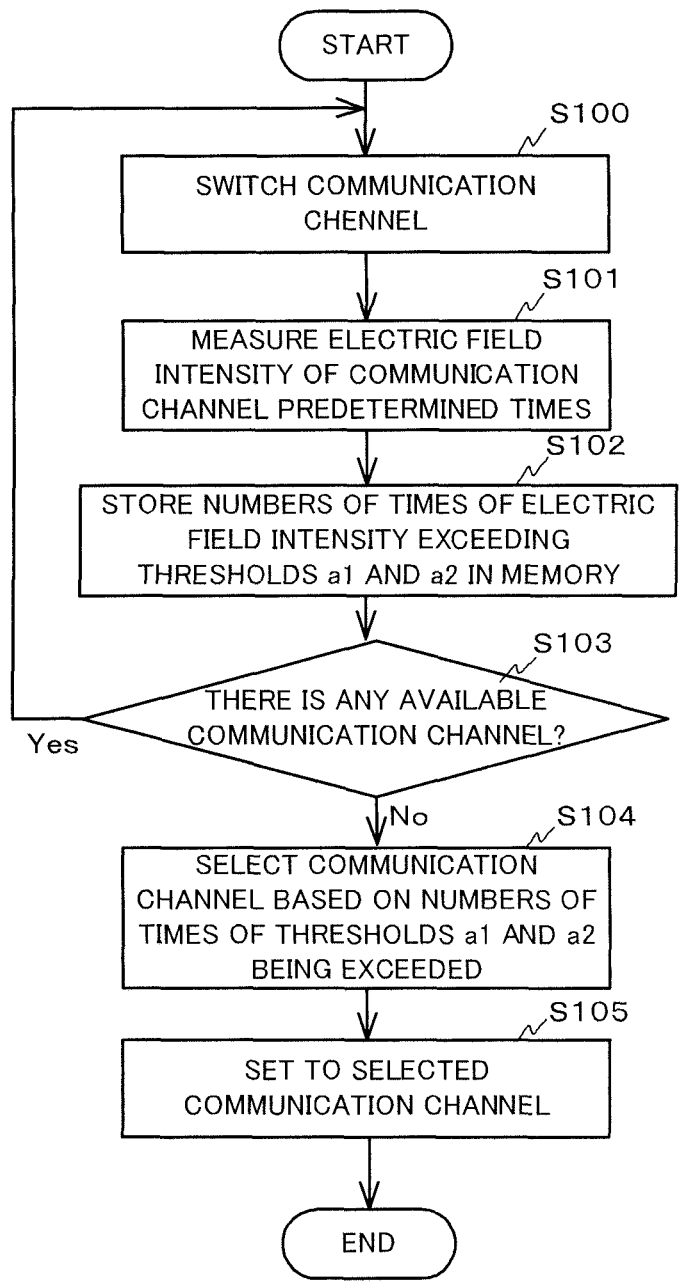
FIG. 4 is a flowchart showing the operation of the wireless communication device (base unit) according to an embodiment of the present invention.

Upon starting the operation, the wireless communication device (base unit) 101 starts searching for a communication channel for use in communication. FIG. 4 shows the procedure to search for a communication channel for use.

First, the controller 16 switches to a communication channel that has not been measured yet among available communication channels (Step S100), More specifically, the controller 16 switches the communication channel for the electric field measuring circuit 13 via the channel determiner 14. Here, none of the communication channels has been measured at this point; therefore, the controller 16 can switch to any communication channel.

Subsequently, the electric field intensity measuring circuit 13 measures the electric field intensity of the switched communication channel a predetermined number of times at predetermined intervals (Step S101). The radio signals received by the antenna 11 are amplified by the wireless circuit 12, The electric field intensity measuring circuit 104 measures the electric field intensity of the amplified radio signals on each communication channel.

Figure 5:
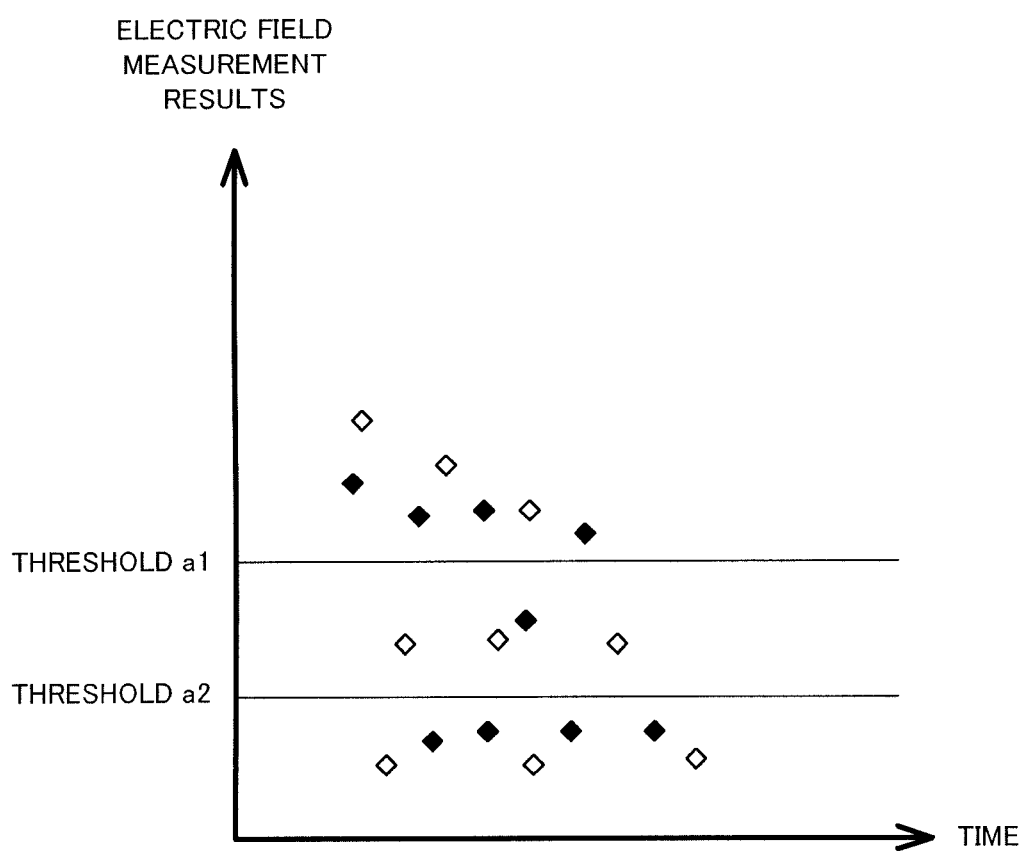
FIG. 5 is a graphical representation showing exemplary electric field intensity measurement results.

FIG. 5 shows exemplary electric field intensity measurement results measured as described above. In FIG. 5, white dots and black dots show the electric field intensities measured on different communication channels, Returning to FIG. 4, the channel determiner 14 counts the numbers of times of the electric field intensity exceeding the thresholds a1 and a2, respectively, and stores the numbers of times in the memory (Step S102), The electric field intensity measurement results measured by the electric field intensity measuring circuit 13 are supplied to the channel determiner 14, The channel determiner 14 compares multiple electric field intensity measurements with the thresholds a1 and a2 stored in the memory of the channel determiner 14 in advance, counts the numbers of times of the thresholds a1 and a2 have been exceeded, respectively, and records the numbers of times in the memory (see FIG. 5).

Incidentally, as described above, as the threshold a1 is set to the carrier sense threshold of the wireless communication device (base unit) 101 and the threshold a2 is set to the level at which the reception sensitivity of the wireless communication device (base unit) 101 deteriorates, namely to the detrimental interference level. The reception sensitivity of the wireless communication device (base unit) 101 is substantially less than the carrier sense threshold; therefore, the threshold a1 is greater than the threshold a2.

Furthermore, assuming that the reception sensitivity of the wireless communication device (base unit) 101 deteriorates by 6 dB upon entrance of interference waves of the detrimental interference level, the threshold a2, or the detrimental interference level, is set to the value calculated as follows:

Detrimental interference level (dBm)=Reception sensitivity of the wireless communication device (base unit) 101 (dBm)−Necessary SNR (SN ratio) of the wireless communication device (base unit) 101 (dB)+6 dB Subsequently, the channel determiner 14 determines whether there is any other available communication channel (Step S103). If here is any other available communication channel (Step S103; Yes), the channel determiner 14 returns to the Step S100. From then on, the channel determiner 14 repeats the Steps S100→S101→S102→S103 until there is no more available communication channel (Step S103; No). In the course of the above processing, the numbers of times of the electric field intensity measurement results exceeding the thresholds a1 and a2 on all available communication channels are stored in the memory of the channel determiner 14.

Subsequently, the channel determiner 14 selects a communication channel for use under a preset rule based on the numbers of times that the electric field intensity measurement results exceed the thresholds a1 and a2 on the communication channels (Step S104).

In this embodiment, the rule consists of selecting the communication channel with the lowest number of times the threshold a2 have been exceeded among the communication channels for which the number of times the threshold a1 has been exceeded is equal to or less than a predetermined number.

Here, for example, the electric field intensity is measured 50 times on each communication channel and the rule consists of selecting the communication channel with the lowest number of times the threshold a2 has been exceeded among the communication channels for which the number of times the threshold a1 has been exceeded is equal to or less than five.

Figures 6, 7:
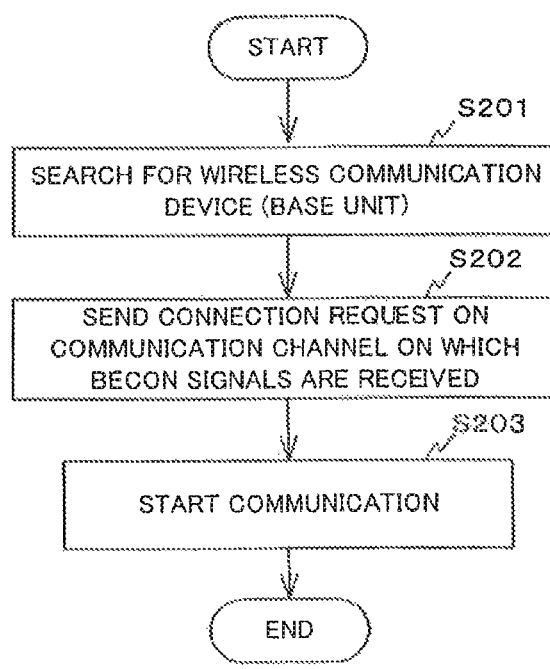
FIG. 6 is an illustration showing a table presenting the numbers of times that the thresholds have been exceeded on the communication channels according to an embodiment of the present invention.
FIG. 7 is a flowchart showing the operation of the wireless communication device (additional unit) according to an embodiment of the present invention.

FIG. 6 shows exemplary numbers of times the channel determiner 14 determined that the thresholds a1 and a2 have been exceeded. In the ease of FIG. 6, CHANNEL C and CHANNEL D are the communication channels for which the number of times the threshold a1 has been exceeded is equal to or less than five. Then, for CHANNEL C and CHANNEL D, the numbers of times of the threshold a2 has been exceeded are compared and CHANNEL C is selected as the communication channel for use.

Other rules are applicable as the rule for selecting a communication channel. For example, an applicable rule can consist of weighting the numbers of times that thresholds (the thresholds a1 and a2 in this embodiment) are exceeded and selecting the communication channel having the highest total value.

It is desirable that the set rule is changeable as appropriate depending on which is important for the wireless communication system 100, whether the available transmission time is longer or shorter or whether the frequency of being interfered with is higher or lower.

Returning to FIG. 4, the controller 16 sets the communication channel selected by the channel determiner 14 as the communication channel for use (Step S105). The controller 16 switches the communication channel for the wireless communication device (base unit) 101 to use in communication based on the communication channel selection result acquired from the channel determiner 14.

Operation of the wireless communication device (additional unit) 102 will be described hereafter with reference to the flowchart of FIG, As shown in FIG. 7, first, the controller 25 of the wireless communication device (additional unit) 102 searches for the wireless communication device (base unit) 101 on all available communication channels (Step S201). Here, the controller 25 may search for beacon signals transmitted from the wireless communication device (base unit) after the communication channel is determined or the wireless communication device (additional unit) 102 may actively search for the wireless communication device (base unit) 101.

Here, the explanation is made with the case in which the wireless communication device (base unit) 101 transmits beacon signals. The controller 25 of the wireless communication device (additional unit) 102 switches the communication channel for use. The wireless communication device (additional unit) 102 waits for reception on each communication channel for a certain time period. The controller 25 receives beacon signals via the antenna 21, wireless circuit 22, and modem 23 on the communication channel determined by the wireless communication device (base unit) 101.

Receiving the beacon signals, the controller 25 of the wireless communication device (additional unit) 102 sends a connection request to the wireless communication device (base unit) 101 via the modem 23 (Step S202), Receiving the connection request from the wireless communication device (additional unit) 102, the controller 25 returns a reply of giving permission to connect to the wireless communication device (additional unit) 102 via the modem 24 and the like.

With the wireless communication device (additional unit) 102 receiving the reply from the wireless communication device (base unit) 101, the wireless communication device (base unit) 101 and wireless communication device (additional unit) 102 establish the connection. Then, the controller 25 of the wireless communication device (additional unit) 102 starts communicating with the controller 16 of the wireless communication device (base unit) 101 (Step S203).

As described above, this embodiment can determine Whether the available transmission time is longer or shorter based on the number of times the electric field intensity has exceeded the first threshold a1 and determine whether the frequency of being interfered with by concurrent transmission waves equal to or less than the carrier sense threshold is higher or lower based on the number of times of the electric field intensity exceeding the second threshold a2. Therefore, it is possible to prolong the available transmission time and select a less frequently interfered communication channel by selecting a communication channel for use based on the above numbers of times. Consequently, the communication efficiency can be improved.

In the above-described embodiment, the wireless communication devices 101 and 102 constituting the wireless communication system 100 are a base unit and an additional unit, respectively. However, it is possible that the wireless communication devices 101 and 102 are configured with no distinction between a base unit and an additional unit and the device that is activated first selects the channel.

In the above-described embodiment, the programs executed can be stored and distributed on a computer-readable recording medium such as a flexible disk, CD-ROM (compact disk read-only memory), DVD (digital versatile disk), and MO (magneto-optical disk) and installed to configure the system executing the above-described processing.

Furthermore, the programs can be stored on a disk device of a predetermined server unit on a communication network such as the Internet and, for example, superimposed on carrier waves and downloaded.

Furthermore, when the above-described functions are partially realized by an OS (operation system) or realized by cooperation of an OS and application programs, only the non-OS part can be stored and distributed on a medium or downloaded.

Various embodiments and modifications are available to the present invention without departing from the broad sense of spirit and scope of the present invention. The above-described embodiment is used for explaining the present invention and does not confine the scope of the present invention. In other words, the scope of the present invention is set forth by the scope of claims, not by the embodiment. Various modifications made within the scope of claims and scope of significance of the invention equivalent thereto are considered to fall under the scope of the present invention.

INDUSTRIAL APPLICABILITY

The present invention is preferably used in wireless communication devices.

REFERENCE SIGNS LIST

11 Antenna
12 Wireless circuit
13 Electric field intensity measuring circuit
14 Channel determiner
15 Modem
16 Controller
21 Antenna
22 Wireless circuit
23 Electric field intensity measuring circuit
24 Modem
35 Controller
100 Wireless communication system
101 Wireless communication device (base unit)
102 Wireless communication device (additional unit)
201 Wireless communication device
202 Wireless communication device
301 Wireless communication device
302 Wireless communication device

The invention claimed is:

1. A wireless communication device, comprising:
an electric field intensity measurer measuring the electric field intensity of each of multiple communication channels available for data communication; and
a channel determiner comparing electric field intensities measured by the electric field intensity measurer with multiple different thresholds including a first threshold as a carrier sense threshold and a second threshold that is the detrimental interference level, the interference of which causes the reception sensitivity to deteriorate, counting the numbers of times that the electric field intensity exceeds the thresholds on each communication channel, and selecting a communication channel for use based on the counted numbers of times that the thresholds have been exceeded on the communication channels.

2. The wireless communication device according to claim 1, wherein
the channel determiner selects the communication channel with the lowest number of times of the second threshold have been exceeded as the communication channel for use among the channels in which the number of times that the first threshold has been exceeded is equal to or less than a predetermined number.

3. The wireless communication device according to claim 1, wherein
the channel determiner determines the communication channel for use based on the integrated value of weighted numbers of times of the thresholds have been exceeded.

4. A wireless communication system comprising the wireless communication device according to claim 1.

5. A channel selection method, comprising:
an electric field intensity measuring step of measuring an electric field intensity of each of multiple communication channels available for data communication; and
a channel determination step of comparing electric field intensities measured in the electric field intensity measuring step with multiple different thresholds including a first threshold as a carrier sense threshold and a second threshold that is the detrimental interference level, the interference which causes the reception sensitivity to deteriorate, counting the numbers of times that the electric field intensity has exceeded the thresholds on each communication channel, and selecting a communication channel for use based on the counted numbers of times that the thresholds have been exceeded on the communication channels.

6. The channel selection method according to claim 5, wherein
in the channel determination step, the communication channel with the least number of times that the second threshold has been exceeded among the channels on which the number of times that the first threshold has been exceeded is equal to or less than a predetermined number is selected as the communication channel for use.

7. The channel selection method according to claim 5, wherein
in the channel determination step, the communication channel for use is determined based on the integrated value of weighted numbers of times of the thresholds have been exceeded.

8. A non-transitory recording medium on which is recorded a program causing a computer to execute procedures of:
measuring an electric field intensity of each of multiple communication channels available for data communication; and
comparing electric field intensities measured in the electric field intensity measuring step with multiple different thresholds including a first threshold as a carrier sense threshold and a second threshold that is the detrimental interference level, the interference which causes the reception sensitivity to deteriorate, counting the numbers of times that the electric field intensity has exceeded the thresholds on each communication channel, and selecting a communication channel for use based on the counted numbers of times that the thresholds have been exceeded on the communication channels.

9. The wireless communication device according to claim 1, wherein
the electric field intensity measurer measures the electric field intensity of each of the multiple communication channels repeatedly multiple times, and
the channel determiner compares each of the multiple electric field intensities measured by the electric field intensity measurer with the multiple different thresholds.

10. The wireless communication device according to claim 1, wherein
the first threshold is greater than the second threshold.

11. The channel selection method according to claim 5, wherein
in the electric field intensity measuring step, the electric field intensity of each of the multiple communication channels is measured repeatedly multiple times, and
in the channel determination step, each of the multiple electric field intensities measured in the electric field intensity measuring step is compared with the multiple different thresholds.

12. The channel selection method according to claim 5, wherein
The first threshold is greater than the second threshold.

13. The non-transitory recording medium on which is recorded a program according to claim 8, wherein
in measuring the electric field intensity, the electric field intensity of each of the multiple communication channels is measured repeatedly multiple times, and
in selecting a channel, each of the multiple electric field intensities measured in the procedure of measuring the electric field intensity is compared with the multiple different thresholds.

14. The non-transitory recording medium on which is recorded a program according to claim 8, wherein
the first threshold is greater than the second threshold.

15. The non-transitory recording medium on which is recorded a program according to claim 8, wherein
in selecting the communication channel, the communication channel for use is determined based on the integrated value of weighted numbers of times that the thresholds have been exceeded.

16. The wireless communication device according to claim 1, wherein
the electric field intensity measurer is configured to measure all communication channels currently available for data communication.

17. The wireless communication device according to claim 1, wherein
the channel determiner is configured to compare each measured electric field intensity against all of the multiple different thresholds.

18. The channel selection method according to claim 5, wherein
the electric field intensity measuring step operates to measure all communication channels currently available for data communication.

19. The channel selection method according to claim 5, wherein
the channel determination step operates to compare each measured electric field intensity against all of the multiple different thresholds.

* * * * *